No. 698,684. Patented Apr. 29, 1902.
T. DUNCAN.
ELECTRICAL MEASURING INSTRUMENT.
(Application filed Jan. 2, 1900. Renewed Jan. 6, 1902.)
(No Model.)
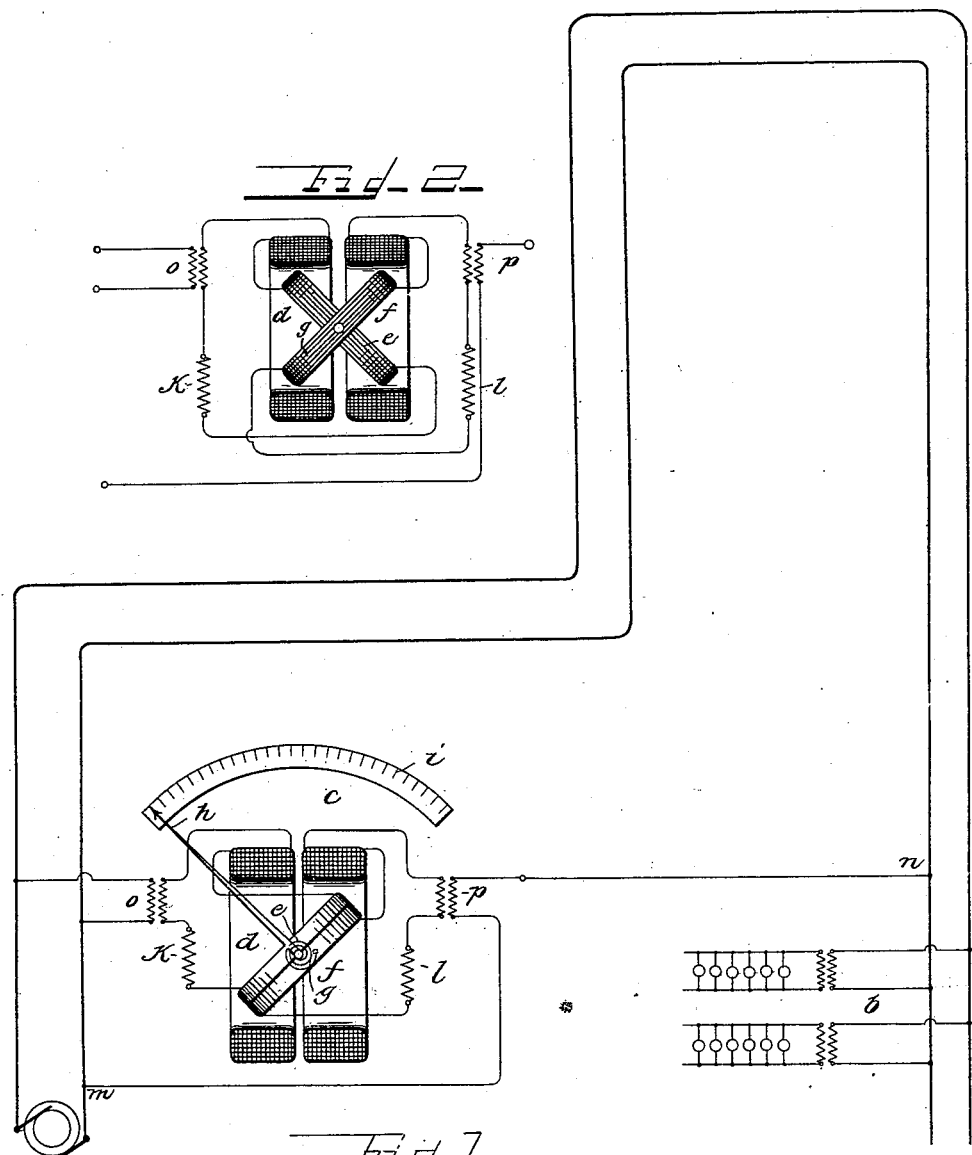

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

ELECTRICAL MEASURING INSTRUMENT.

SPECIFICATION forming part of Letters Patent No. 698,684, dated April 29, 1902.

Application filed January 2, 1900. Renewed January 6, 1902. Serial No. 88,491. (No model.)

*To all whom it may concern:*

Be it known that I, THOMAS DUNCAN, a citizen of the United States, residing at Chicago, in the county of Cook and State of Illinois, have invented a certain new and useful Improvement in Electrical Measuring Instruments, (Case No. 346,) of which the following is a full, clear, concise, and exact description, reference being had to the accompanying drawings, forming a part of this specification.

My invention relates primarily to alternating-current systems of distribution, although certain features of the invention may be employed in connection with other systems of distribution; and the invention has for its object the provision of an improved compensating voltmeter which is adapted to accurately determine the pressure at a distant point in a system of transmission.

When the pressure at any point distant from the generating-station is accurately determined, this pressure may be maintained constant by regulation of the impressed pressure to compensate for load changes and the C R drop over the distributing-lines due thereto, which varies directly as the load.

Two ways have hitherto been frequently practiced to measure the pressure at a predetermined point in the line distant from the generating-station. A common way is to employ an ordinary voltmeter upon the station-switchboard which is connected at the distant point—as, for example, the center of distribution—by means of two pressure-wires, the instrument then indicating the pressure at the distant point. When the distance between the distant predetermined point of the line and the generating-station is great, the expense of these pressure-wires is significant when a great number of machines are used. It has also been the practice to employ a voltmeter included in a circuit with two secondary coils whose primaries are respectively in series with a main transmission-line and bridged between the transmission-lines. This method, however, is objectionable, since the meters do not under all circumstances exactly measure the pressure at distant points, as the effect of the series transformer-coil is the same irrespective of the distribution of the load.

By means of my present invention I am enabled to dispense with a pressure-wire employed in one of the aforesaid prior methods, to reduce the cost of line construction, and at the same time maintain accuracy in the determination of the pressure at the distant point of distribution where the pressure is to be measured. I am also enabled to overcome the disadvantages of the second aforesaid prior method of determining the pressure at points distant from the generator-station in that I am enabled to accurately determine this pressure irrespective of the distribution of the load.

In my application Serial No. 90, filed of even date herewith, I have disclosed an instrument comprising two stationary field-coils, one interposed between the generator-terminals and the other interposed between a point of the transmission-circuit near the generator and a distant point of the transmission-circuit, and a third revoluble coil included in series with the coil interposed between the generator-terminals.

In my present invention I employ two windings, each divided into a fixed and a movable coil. The movable coils are preferably mechanically coupled and serve jointly to indicate the pressure at a distant point of the transmission system. One of the windings is interposed between the generator-terminals and the other is interposed between a point near the generator and a distant point of a transmission-line. The revoluble coils may be mounted upon a shaft and in order to measure the movements of these coils a pointer may be attached to the shaft, and a scale provided upon which the pointer may indicate measurements. The windings of the meter serve to create two component torques, one proportional to the impressed pressure and the other proportional to the CR drop in the line, the movement of the pointer being proportional to the algebraic sum of the effects of the component torques.

I will explain my invention more particularly by reference to the accompanying drawings, in which—

Figure 1 diagrammatically illustrates apparatus constructed in accordance with the preferred embodiment of my invention and a system of distribution with which the said apparatus is associated. Fig. 2 is a diagrammatic view showing a modification of an instrument constructed in accordance with my invention.

Like parts are indicated by similar letters of reference in both views.

In Fig. 1 I have illustrated an alternating-current system of distribution, a source of alternating current $a$ being shown as supplying current to translating devices $b$. The instrument $c$ may be constructed as shown in Fig. 1. The winding of the meter interposed between the generator-terminals is divided into a stationary field-coil $d$ and the revoluble coil $e$. The winding interposed between a point near the generator and a distant point of the transmission-line is divided into the stationary field-coil $f$ and the revoluble coil $g$. The revoluble coils are preferably jointly subject to the action of each of the fixed coils.

In Fig. 1 the coils $e$ and $g$ are shown side by side. In Fig. 2 they are shown at right angles to each other. In order to adapt the instrument to the measurement of voltages in alternating-current systems of electrical distribution, the coils thereof are unprovided with iron cores. A pointer $h$ moves with the revoluble coils, a scale $i$ being provided upon which the pointer may indicate measurements. The coils $d$ and $e$ are preferably included in series, as are also the coils $f$ and $g$; but I do not wish to be limited to this series arrangement. A resistance $k$ extraneous to the winding composed of the coils $d$ and $e$ is provided to prevent waste of current, a resistance $l$ for like purpose being also included in series with the winding composed of the coils $f$ and $g$.

Torsional springs may be provided in the well-known way to oppose the torques of the instrument. In the present instance I have indicated a system of alternating-current distribution of high electromotive force, and instead of connecting the windings of the meter directly between the mains of the system and the conductor interposed between a point of the transmission-circuit $m$ near the generator and a distant point $n$ I employ transformers $o$ and $p$, whose primaries are connected, respectively, between the mains of the system and with the said conductor. This conductor, it will be observed, is in the present instance in shunt of one of the mains. The instrument when thus connected in circuit is adapted to effect a movement of the pointer proportional to the algebraic sum of the impressed pressure and the $c\ r$ drop. When the instrument is thus in circuit, there being no load on the system, the instrument will indicate only the impressed pressure. When a load is put upon the system and as it increases, the current in the coils $f$ and $g$ will increase proportionally to the drop over the lines. The windings of the meter create opposing torques, the algebraic sum of the effects whereof is indicated by the pointer upon the scale. If, for example, the dynamo-pressure is one hundred and four volts and the drop over the lines is four volts, then the resultant volts indicated on the instrument will be one hundred and four volts minus four volts, equaling one hundred volts.

I preferably so adjust the windings of the instrument that the winding receiving its current from the transformer $p$ will produce relatively twice the torque for a given pressure impressed at its terminals than that due to the winding receiving its current from the transformer $o$.

While I have shown transformers for supplying current to the windings of the instrument, I do not wish to be limited to this particular means.

While I have herein shown and particularly described one embodiment of my invention, it is obvious that changes may readily be effected without departing from the spirit thereof, and I do not, therefore, wish to be limited to the precise construction shown; but,

Having thus described my invention, I claim as new and desire to secure by Letters Patent—

1. In a system of electrical distribution, the combination with a generator supplying the same with current, of a voltmeter having two windings, one for subjection to pressure between the generator-terminals and the other for subjection to pressure between a point near the generator and a distant point of the transmission system, each of said windings being divided into a fixed and a revoluble coil, substantially as described.

2. In a system of electrical distribution, the combination with a generator supplying the same with current, of a voltmeter having two windings, one for subjection to pressure between the generator-terminals and the other for subjection to pressure between a point near the generator and a distant point of the transmission system, each of the said windings being divided into a fixed and a revoluble coil, the said revoluble coils being mechanically coupled, substantially as described.

3. In a system of electrical distribution, the combination with a generator supplying the same with current, of a voltmeter having two windings, one for subjection to pressure between the generator-terminals and the other for subjection to pressure between a point near the generator and a distant point of the transmission system, each of the said windings being divided into a fixed and a revoluble coil, each of the revoluble coils being influenced by each of the fixed coils, substantially as described.

4. In a system of electrical distribution, the combination with a generator supplying the same with current, of a voltmeter having two windings, one for subjection to pressure between the generator-terminals and the other for subjection to pressure between a point near the generator and a distant point of the transmission system, each of the said windings being divided into a fixed and a revoluble coil, each of the revoluble coils being influenced by each of the fixed coils, a pointer movable with the revoluble coils, and a scale, substantially as described.

5. In a system of electrical distribution, the combination with an alternating-current generator supplying the same with current, of a voltmeter having two windings, one for subjection to pressure between the generator-terminals and the other for subjection to pressure between a point near the generator and a distant point of the transmission system, each of said windings being divided into a fixed and a revoluble coil, the windings of the meter being coreless, substantially as described.

6. In a system of electrical distribution, the combination with an alternating-current generator supplying the same with current, of a voltmeter having two windings, one for subjection to pressure between the generator-terminals and the other for subjection to pressure between a point near the generator and a distant point of the transmission system, each of the said windings being divided into a fixed and a revoluble coil, the said revoluble coils being mechanically coupled, the windings of the meter being coreless, substantially as described.

7. In a system of electrical distribution, the combination with an alternating-current generator supplying the same with current, of a voltmeter having two windings, one for subjection to pressure between the generator-terminals and the other for subjection to pressure between a point near the generator and a distant point of the transmission system, each of the said windings being divided into a fixed and a revoluble coil, each of the revoluble coils being influenced by each of the fixed coils, the windings of the meter being coreless, substantially as described.

8. In a system of electrical distribution, the combination with an alternating-current generator supplying the same with current, of a voltmeter having two windings, one for subjection to pressure between the generator-terminals, and the other for subjection to pressure between a point near the generator and a distant point of the transmission system, each of said windings being divided into a fixed and a revoluble coil, each of the revoluble coils being influenced by each of the fixed coils, a pointer movable with the revoluble coils, and a scale, the windings of the meter being coreless, substantially as described.

9. In a system of electrical distribution, the combination with a generator supplying the same with current, of a voltmeter having two windings, one for subjection to pressure between the generator-terminals and the other for subjection to pressure between a point near the generator and a distant point of the transmission system, each of said windings being divided into a fixed and a revoluble coil, the latter winding receiving current from a conductor connected in shunt of a transmission-conductor, or a portion thereof, substantially as described.

10. In a system of electrical distribution, the combination with a generator supplying the same with current, of a voltmeter having two windings, one for subjection to pressure between the generator-terminals, and the other for subjection to pressure between a point near the generator and a distant point of the transmission system, the latter winding receiving current from a conductor connected in shunt of a transmission-conductor or a portion thereof, each of said windings being divided into a fixed and a revoluble coil, the said revoluble coils being mechanically coupled, substantially as described.

11. In a system of electrical distribution, the combination with a generator supplying the same with current, of a voltmeter having two windings, one for subjection to pressure between the generator-terminals and the other for subjection to pressure between a point near the generator and a distant point of the transmission system, the latter winding receiving current from a conductor connected in shunt of a transmission-conductor or a portion thereof, each of the said windings being divided into a fixed and a revoluble coil, each of the revoluble coils being influenced by each of the fixed coils, substantially as described.

12. In a system of electrical distribution, the combination with a generator supplying the same with current, of a voltmeter having two windings, one for subjection to pressure between the generator-terminals, and the other for subjection to pressure between a point near the generator and a distant point of the transmission system, the latter winding receiving current from a conductor connected in shunt of a transmission-conductor or a portion thereof, each of said windings being divided into a fixed and a revoluble coil, each of the revoluble coils being influenced by each of the fixed coils, a pointer movable with the revoluble coils, and a scale, substantially as described.

In witness whereof I hereunto subscribe my name this 20th day of December, A. D. 1899.

THOMAS DUNCAN.

Witnesses:
WILLIAM F. MEYER,
JAMES W. DALTON.